Oct. 5, 1965　　　H. B. RICE　　　3,209,897
CONVEYOR STRUCTURE
Filed Dec. 12, 1961　　　3 Sheets-Sheet 1
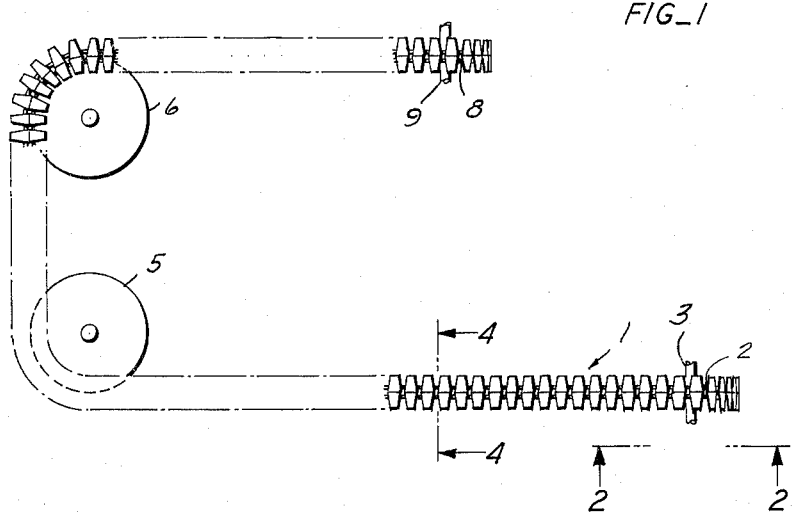
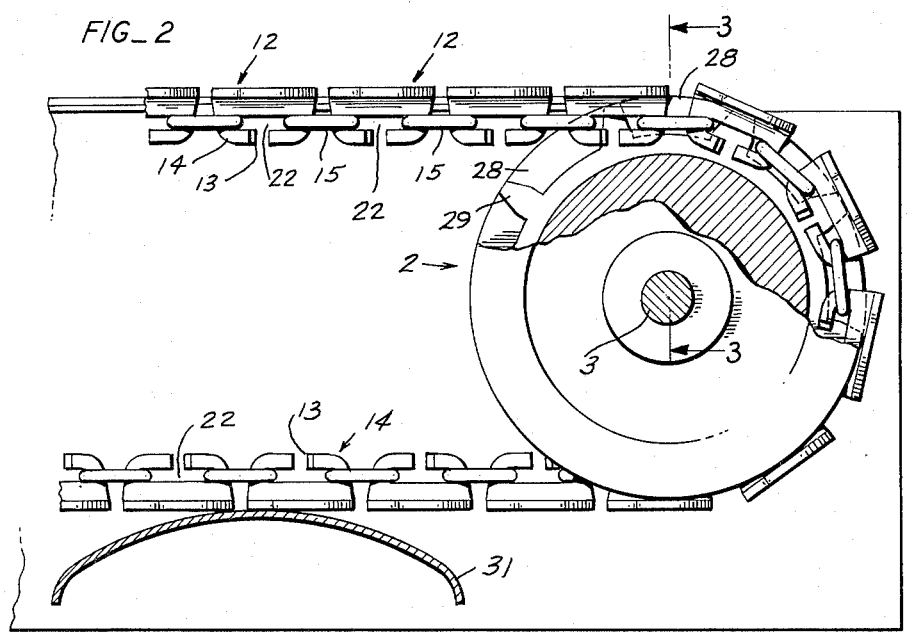
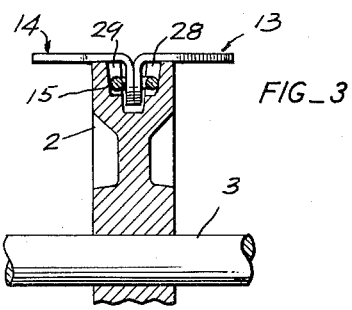
INVENTOR.
HAROLD B. RICE
BY
Bayken, Mohler & Wood
ATTORNEYS Oct. 5, 1965     H. B. RICE     3,209,897
CONVEYOR STRUCTURE
Filed Dec. 12, 1961     3 Sheets-Sheet 2
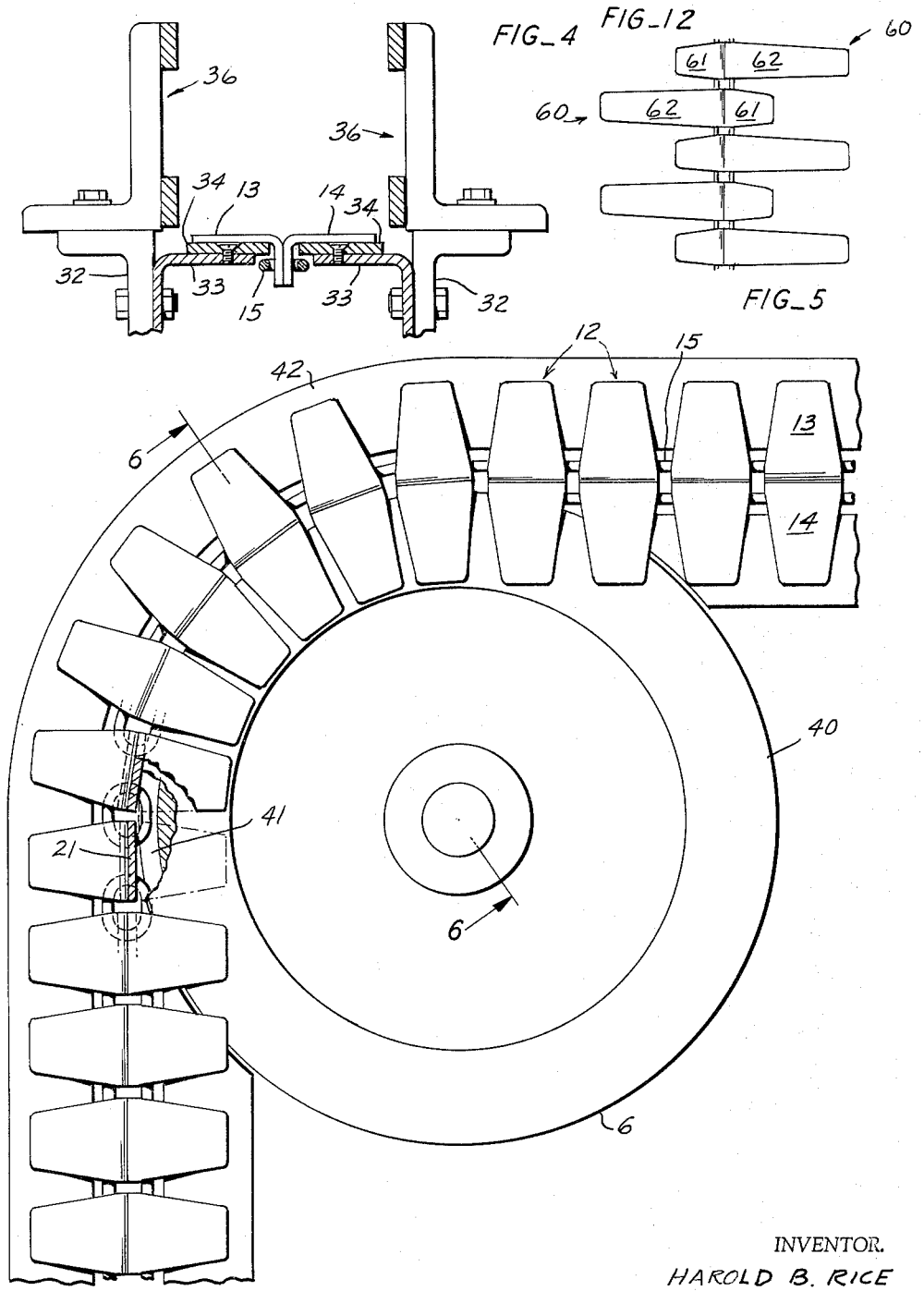
INVENTOR.
HAROLD B. RICE
BY
Boyken, Mohler & Wood
ATTORNEYS

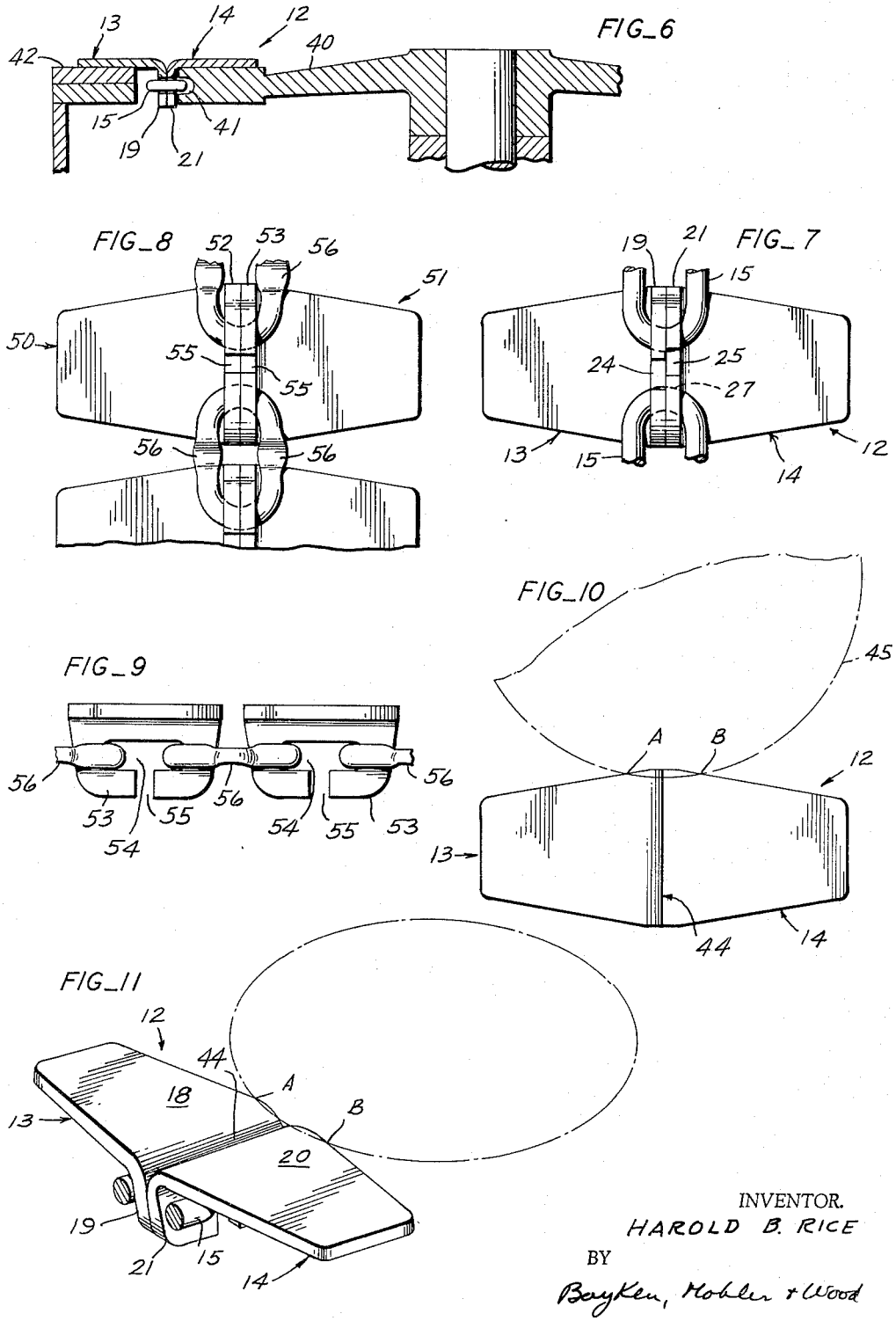

United States Patent Office
3,209,897
Patented Oct. 5, 1965

3,209,897
CONVEYOR STRUCTURE
Harold B. Rice, Walnut Creek, Calif., assignor to John
Burton Machine Corporation, Concord, Calif.
Filed Dec. 12, 1961, Ser. No. 158,766
2 Claims. (Cl. 198—189)

This invention relates to conveyors for supporting articles thereon for movement of the latter along a predetermined path of travel. More particularly the invention relates to construction of the conveyor elements which are connected together to form the moving support on which the articles are carried.

Heretofore various types of article supporting conveyors have been provided in which a plurality of spaced apart article supporting platforms are connected together by chain links thereby forming a continuous chain in which alternate links consist of article supporting elements or platforms. The chain connections provide the articulation necessary to permit the conveyor to be passed around vertically disposed driving and idler sprockets which are required to actuate the conveyor and which are positioned in the vertical central plane of the conveyor. Also, such articulation permits the chain to be passed around horizontally disposed turning wheels for turning the conveyor around corners for changing its direction.

The type of conveyor to which the present invention is directed has heretofore consisted of a plurality of unitary platform elements which are supported for sliding along horizontally disposed guides. Said article supporting elements are each generally provided with an integral downwardly extending flange which is formed to provide an opening for receiving the adjacent chain links therein so that the platform flanges, in effect, act as alternate chain links.

Several disadvantages are present in the above described type of conveyor now in use. For example, the conveyor tends to be somewhat inflexible and is noisy in operation. Such inflexibility is in part due to the fact that the platform elements and their integral flanges form unitary rigid members which tend to become cocked due to local irregularities in the conveyor supporting structure. Furthermore, since the conveyor elements are of an intricate shape, they have in the past been cast so that the connections between the flanges and the chain are inaccurate unless expensive machining operations are employed after casting; such machining rendering the chain construction impractical because of the attendant expense. The above noted disadvantages also contribute to an increase in the noise level of operation. The operational noise is also increased because when the article supporting platform elements and their supported articles move relative to each other a sharp impact results from engagement of the bottom of the articles with the edges of the platforms. This last mentioned noise source cannot be satisfactorily obviated by merely rounding off the edges of the platforms because such procedure results in a reduction of the total effective supporting area of the conveyor thereby reducing the ability of the conveyor to maintain the conveyed articles in an upright position.

The main object of the present invention is to eliminate the above noted disadvantages of the general type of conveyor chain herein contemplated.

Another object of the invention is to provide a novel conveyor structure that permits the conveyor elements to be made from stampings thus reducing the cost of manufacture and at the same time promoting greater accuracy in comparison to castings.

Other objects and advantages will be apparent from the following specification and from the drawings:

FIG. 1 is a semischematic top plan view of a typical conveyor system showing only the conveyor and associated sprockets and turning wheels;

FIG. 2 is a side elevation partly broken away and in section showing the cooperation between the driving sprocket and the conveyor chain and as indicated by lines 2—2 of FIG. 1;

FIG. 3 is a typical vertical section of the sprocket of FIG. 3 as taken along lines 3—3 of FIG. 2;

FIG. 4 is a typical cross section of a conveyor supporting structure for the upper run of the conveyor chain;

FIG. 5 is a greatly enlarged top plan view of one of the turning wheels of FIG. 1 partly broken away and in section to show the cooperation between the wheel and the chain;

FIG. 6 is a typical vertical section through the turning wheel as taken along lines 6—6 of FIG. 5;

FIG. 7 is a bottom plan view of an article supporting platform showing the cooperation between the chain links and the platform sections;

FIG. 8 is a view similar to FIG. 7 showing a modified structure adapted to produce somewhat the same result as the structure of FIG. 7;

FIG. 9 is a side elevation of a pair of adjacent article supporting platform showing the cooperation between the platform flanges and the chain links of FIG. 8;

FIG. 10 is a top plan view of an article supporting platform showing schematically by reference to a cylindrical article the cooperation between the article and the conveyor platform;

FIG. 11 is a perspective of the structure of FIG. 10;

FIG. 12 is a top plan view of a portion of a conveyor showing a modified form thereof.

In detail, and first with reference to FIG. 1, the invention is illustrated in connection with a typical installation comprising a conveyor generally designated 1 which is passed around and driven by a driving sprocket 2 supported on a drive shaft 3. The upper and lower runs of the conveyor are passes around idler turning wheels 5, 6 to change the direction of the conveyor and an idler sprocket 8 mounted on a shaft 9 returns the conveyor to driving sprocket 2.

The driving sprocket 2 is more clearly disclosed in FIGS. 2, 3 and turning wheel 6 is shown in FIGS. 5, 6. Idler sprocket 8 is of course similar to drive sprocket 2 and turning wheel 5 is similar to turning wheel 6 shown in FIG. 5.

Referring now to FIGS. 7, 11 the preferred form of the article supporting platform of the present invention, generally designated 12, consists of two separable sections 13, 14 which are unconnected except for the chain links 15 which function not only to hold the sections 13, 14 together to form a platform but also connect adjacent platforms.

Platform section 13 comprises a horizontally extending article supporting portion 18 (FIG. 11) and an integral vertical flange 19. Similarly platform section 14 comprises a horizontal article supporting portion 20 and an integral vertical flange 21. The flanges 19, 21 are provided with recesses 22 (FIG. 2) for receiving therein the chain links 15. The recesses 22 each include a restricted portion adjacent the lower edge of flanges 19, 21. In FIG. 7 the restricted portion of the recess in flange 19 is indicated at 24 and the restricted portion of the recess in flange 21 is indicated at 25. Each of these restricted portions of recesses 22 provides for entrance into said openings of the bar of one chain link only so as to reduce the likelihood of the chain falling out of the recesses when the conveyor is slack.

An important feature of this invention is the staggered arrangement of the restricted portions 24, 25 of flanges 19, 21. As seen in FIG. 7, the two platform sections 13, 14 are identical but the restricted portions 24, 25 are offset in the same direction and to the same extent from the central plane of the platform which corresponds to a transverse vertical plane of the conveyor. Thus, although the bar of one of the links 15 may pass into the recesses 22 in flanges 19, 21 when the platform sections 13, 14 are shifted to a position in which the restricted portions 24, 25 of recesses 22 are in registration, with the conveyor slack, the bar of the chain cannot pass through the even more restricted opening when the flanges 19, 21 are in registration as shown in FIG. 7. This structure ensures against inadvertent disassembly of the conveyor and yet permits assembly to be readily effected.

It will be noted that the inner portion of recesses 24 consists of an elongated slot which corresponds to the elongated slot formed by the bar of each chain link. The portions of flanges 19, 21, which define the ends of the slot may be chamfered as at 27 (FIG. 7) to provide a rounded surface to cooperate with the rounded surface formed by the bar of the cooperating chain link.

It will be apparent that the shape of the platform sections 13, 14 is such that they may readily be stamped from a plate of whatever material it is desired to employ for the article support. The fact that platform sections 13, 14 are identical further simplifies the manufacturing process. If each platform element comprised a one-piece horizontal portion and an integral flange portion, as in the present construction, manufacturing by stamping would not be possible.

The assembly of the chain will be obvious: it is merely necessary to shift the platform section of FIG. 7 so that restricted openings 24, 25 are in registration and then insert two links 15 into recesses 22 one at a time, the next platform sections are then connected to the assembly, and so on.

The chain is passed around drive sprocket 2 and idler sprocket 8 by inserting each chain link and adjacent portions of adjacent platforms into the peripheral recesses 28 (FIG. 2) of the sprockets which are formed intermediate equally spaced teeth 29 of the sprockets. The structure of sprocket 2 as shown in conventional and the conveyor of the present invention cooperates with the sprocket in the same manner as existing conveyors.

If necessary, the lower ram of the conveyor may be supported at spaced points along its length by support guides 31 fixed to the conveyor frame structure as indicated at 31 in FIG. 2.

Referring to FIG. 4, the frame 32 of the conveyor is provided with support plates 33 to which may be secured longitudinally extending wear strips 34 for receiving thereon the undersides of platform sections 13, 14. To hold the conveyed articles on the desired path of travel vertically disposed guides generally designated 36 may be provided as required. In this connection it will be noted from FIG. 4 that the separable portions 13, 14 of the article support platform conform more readily to the contour of their supporting structure than would be the case if the platform and flange were made in one integral piece. This fact contributes to keeping the conveyed articles upright and reduces noise.

The advantages of two-piece construction of the platform are further apparent from FIGS. 5, 6 which show the cooperation of the conveyor with the turning wheel 6. Each turning wheel 5, 6 includes upper disks 40 cooperating with the upper run of the chain and identical lower disks (not shown) cooperating in a similar manner with the lower run. Each disk 40 is provided with a radially outwardly opening groove 41 for receiving therein the portions of chain links 15 that are inwardly of the inner flange 21 of platform section 14. The periphery of disk 40 of course supports the inner platform section 14 while a curved support 42 secured to the conveyor frame supports the outer platform section 13. Again it will be apparent that the two-piece construction of the platform contributes to truer cooperation between the conveyor and its surrounding structure because slight shifting between the two platform sections is permitted.

It will be noted that the juncture between the horizontal and vertical portions of each platform section is formed to a radius so that a cusp-like recess 44 is provided along the central plane of each article supporting platform (FIG. 11). This recess 44 has an important effect on the operation of the conveyor as can be seen from FIGS. 10, 11.

In canning and bottling operations relative movement between the supported articles and the conveyor occurs frequently; for example, when the articles are being held stationary awaiting movement by the conveyor to a station for processing. In such a case, and especially in high speed conveyors, the impact between the platforms and the articles not only tends to upset the articles but creates a tremendous noise. By the present invention both of these disadvantages are in part overcome since engagement between the conveyor and article is made at points spaced on opposite sides of the central planes of the conveyor. Thus, referring to FIGS. 10, 11 it will be seen that, because of recess 44, no engagement is made by the bottom of round article 45 with the platform 12 at the central plane of the conveyor but rather at points A, B offset from said central plane. In other words, the round article 45 is actually over the platform before engagement is made. This fact, together with the fact that a two point contact is made, reduces the likelihood of upsetting the article and also considerably reduces the noise caused by the engagement.

A modified form of the conveyor is shown in FIGS. 8, 9 wherein the structure of platform sections 50, 51 is the same as sections 13, 14 above described except that flanges 52, 53 are provided with recesses 54 having restricted openings 55 in the central transverse plane of the conveyor rather than offset as in FIG. 7. Thus the restricted openings are in registration when the conveyor is in its normal operating position.

In the structure of FIGS. 8, 9 the chain is prevented from inadvertently coming out of recesses 54 by flattening the bar of each chain link intermediate its ends as shown at 56 so that the flattened portions may enter restricted openings 55 but not the remainder of the bar having a circular cross section. The construction of FIGS. 8, 9 is somewhat more effective than that of FIG. 7 in preventing inadvertent disassembly of the conveyor but the modification of the chain links is an added expense which makes the structure of FIG. 7 preferable in most instances.

It will be seen that the above described two-piece platform structure is less expensive to make and smoother and quieter in operation than the prior art one-piece structure. Furthermore, the conveyor is easily assembled and disassembled and, since there are no greased bearings the conveyor may be cleaned by steam when desired.

The above described conveyor is one that lends itself to use in the canning and bottling industries but may be readily adapted for handling large objects such as cases as shown in FIG. 12. In this case each platform 60 consists of a short section 61 and a long section 62. By staggering the arrangement of the short and long sections as shown in FIG. 12 a wide conveyor capable of turning corners may be constructed. The advantages inherent in the above described symmetrical conveyor also accrue to the short and long section platforms of FIG. 12.

The above very specific description of the preferred forms of the invention should not be taken as restrictive thereof as it will be apparent that various modifications in design may be resorted to by those skilled in the art without departing from the scope of the appended claims.

I claim:

1. Conveyor chain construction comprising: a pair of separable platform sections arranged togethed to form a single article supporting platform, each of said pair of sections including a vertically disposed flange with the flanges of each pair in abutment at the vertical central plane of said platform, corresponding recesses in said flanges for receiving chain links therein for connecting said platform with adjacent platforms, said recesses being restricted in size adjacent the lower edges of said flanges to permit the passage therein of one chain bar only and enlarged at a point upwardly from said lower edge to accommodate the two chain bars of adjacent links, the restricted portions of the openings of said abutted flanges being relatively offset when the enlarged portions of said openings are in registration to prevent disconnection of said chain from said sections when said flanges are in registration.

2. In a conveyor for supporting articles for movement along a path of travel, a plurality of article supporting platforms, a plurality of links each connecting a pair of adjacent platforms to form a continuous conveyor, each of said platforms comprising a pair of separable platform sections extending transversely of said path of travel and connected together by an adjacent pair of links, one of said pair of sections being substantially longer and extending a greater distance laterally outwardly from the central plane of said conveyor than the other, and said long sections being in alternating relation relative to the other sections in a direction along said path of travel.

References Cited by the Examiner
UNITED STATES PATENTS

| | | |
|---|---|---|
| 414,416 | 11/89 | Jennings. |
| 2,368,233 | 1/45 | Lyon. |
| 2,402,376 | 6/46 | Dalrymple _____ 198—189 |
| 2,440,212 | 4/48 | Schmidt _____ 198—189 |
| 2,443,947 | 6/48 | Brooks et al. _____ 198—189 |
| 2,515,079 | 7/50 | Dalrymple _____ 198—189 |
| 2,785,578 | 3/57 | Nold _____ 198—189 |

SAMUEL F. COLEMAN, *Primary Examiner.*

JULIUS E. WEST, ERNEST A. FALLER, ROBERT B. REEVES, *Examiners.*